United States Patent [19]
Astrom

[11] Patent Number: 5,876,612
[45] Date of Patent: Mar. 2, 1999

[54] METHOD AND APPARATUS FOR CLEANING FILTER MATERIAL IN A FILTER APPARATUS

[75] Inventor: Gordon Astrom, Mount Morris, Ill.

[73] Assignee: Aqua-Aerobic Systems, Inc., Rockford, Ill.

[21] Appl. No.: 808,016

[22] Filed: Mar. 3, 1997

[51] Int. Cl.[6] .......................... B01D 37/00; B01D 33/48; B01D 33/50

[52] U.S. Cl. .......................... 210/741; 210/106; 210/107; 210/393; 210/408; 210/780; 210/791

[58] Field of Search .................................. 210/85, 86, 97, 210/106, 107, 108, 331, 332, 333.01, 333.1, 391, 393, 394, 408, 409, 411, 739, 744, 780, 791, 797, 798

[56] References Cited

U.S. PATENT DOCUMENTS

| | | | |
|---|---|---|---|
| 1,335,695 | 3/1920 | Oliver. | |
| 1,560,796 | 11/1925 | Genter | 210/798 |
| 1,649,581 | 11/1927 | Genter et al. | |
| 2,022,069 | 11/1935 | Whitmore | 210/797 |
| 2,351,652 | 6/1944 | Anderson | 210/798 |
| 2,460,280 | 2/1949 | Finney | 210/393 |
| 4,090,965 | 5/1978 | Fuchs | 210/391 |
| 4,639,315 | 1/1987 | Fuchs et al. | 210/333.1 |
| 5,362,401 | 11/1994 | Whetsel | 210/741 |
| 5,374,360 | 12/1994 | Weis | 210/780 |

OTHER PUBLICATIONS

"Aqua Filter", Aqua–Aerobic Systems, Inc., Bulletin No. 100M, Jan., 1993.

*Primary Examiner*—Joseph W. Drodge
*Attorney, Agent, or Firm*—Michael, Best & Friedrich

[57] ABSTRACT

The present invention is directed to a filter apparatus for filtering out suspended solids from liquid that is passed through filter material supported within a tank. The invention is also directed to a method of cleaning the filter material while the filter material remains inside the tank. The disclosed apparatus and method facilitates the removal of solids which are deposited on the filter material during the filtering operation, as well as biogrowth and other foreign matter. The cleaning method utilizes a suction generating device, such as a pump and associated suction heads, for backwashing the filter material. The cleaning method also utilizes a device for directing a liquid stream of a chemical cleaning solution at high velocity to the filter material thereby chemically washing the filter material and dislodging filtered solids and other foreign matter therefrom. The suction heads and the nozzle heads are positioned relative to the filter material such that substantially all of the runoff which results from operation of the liquid directing device is removed from the filter material by the suction heads.

25 Claims, 2 Drawing Sheets

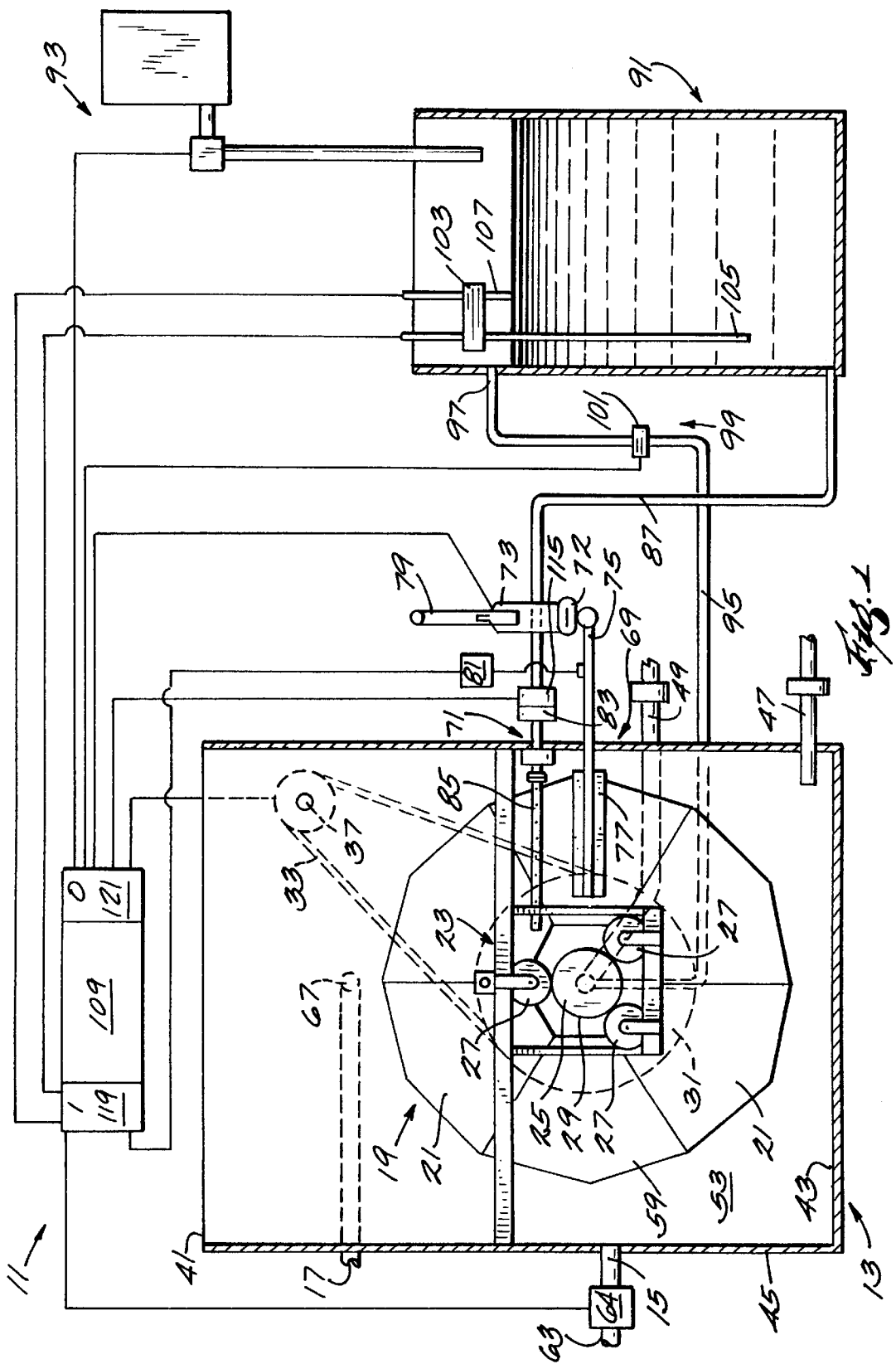

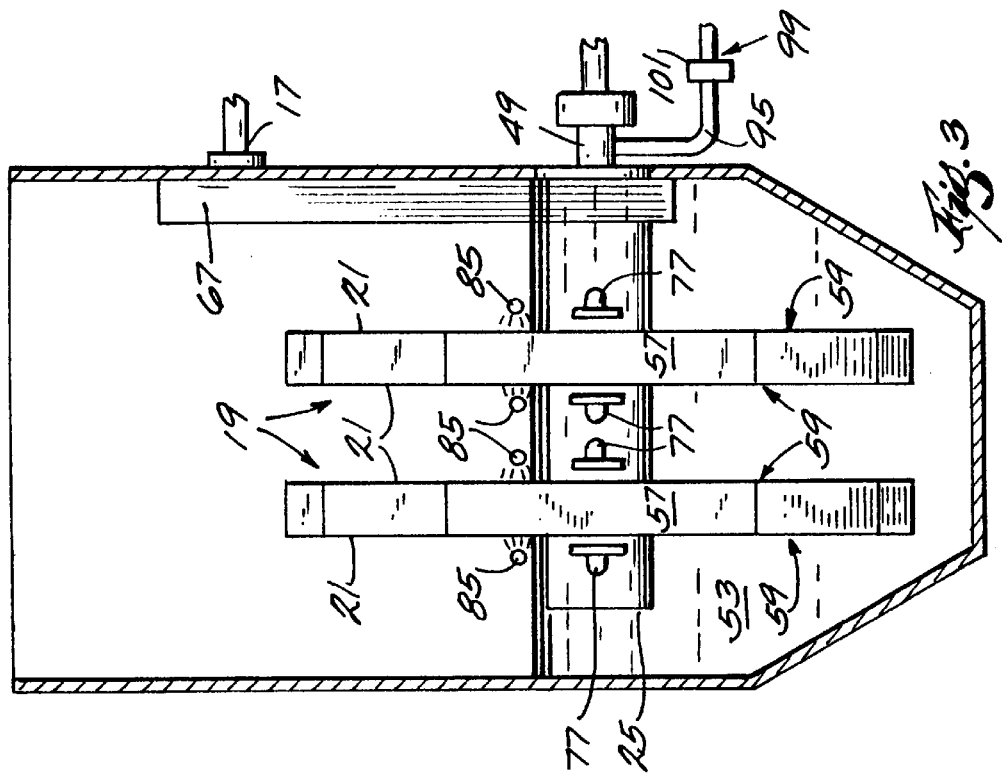
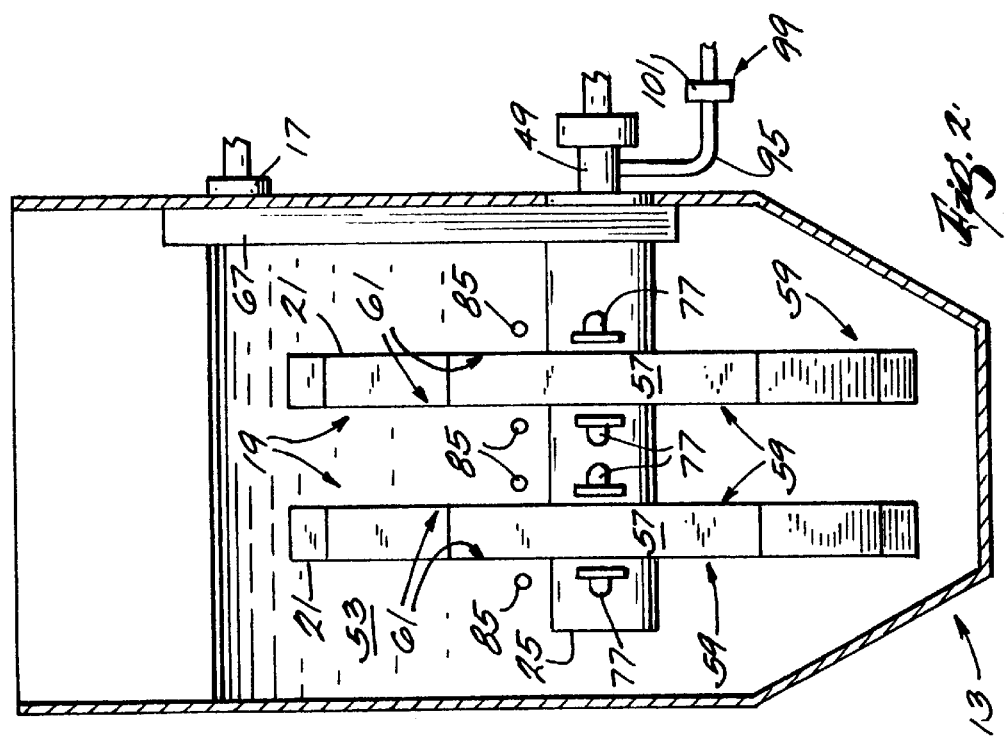

METHOD AND APPARATUS FOR CLEANING FILTER MATERIAL IN A FILTER APPARATUS

FIELD OF THE INVENTION

The present invention relates generally to a filter apparatus for filtering out suspended solids from liquid influent that is passed through filter material. More particularly, the present invention relates to a method and apparatus for cleaning the filter material.

BACKGROUND OF THE INVENTION

A filter apparatus for filtering suspended solids is disclosed in U.S. Pat. Nos. 5,374,360, issued to Weis, and 5,362,401, issued to Whetsel. The filter apparatus shown there comprises a tank having an inlet and an outlet, one or more filter frames positioned between the inlet and outlet, and filter material supported within the filter frames. During a filtering operation, liquid influent is passed through the filter material such that the filter material filters out suspended solids from the influent stream. The filtered solids are deposited on the filter material while the filtered liquid stream is discharged from the tank as effluent.

To clean the filter material of filtered solids without having to remove the filter frames from the tank, it is known to provide the filter apparatus with a suction generating device having one or more suction heads positioned adjacent a surface of the filter material. It is also known to provide spray nozzles for directing a high-pressure liquid spray to another surface of the filter material. Typically, the spray nozzles are fed by a pump which draws water from a source external to the filter apparatus. The known method of cleaning the filter material is a two-stage process involving the operation of these two components.

In a first stage called the backwash operation, the suction generating device is operated to draw filtered liquid through the filter material in a reverse or backwash direction. The backwash stream that results acts to dislodge solids which have been deposited on the surfaces of the filter material.

In practice, filtered solids continue to accumulate within the filter material despite successive backwash operations. In a second stage of the cleaning process, the spray nozzles are operated to direct a high-pressure liquid spray to the surface of the filter material. The spray acts to dislodge solids which are deeply entrained in the filter material and cannot be removed by the backwash operation. Typically, the dislodged solids either sink to the tank bottom or dissipate into the liquid influent to be re-filtered and eventually removed from the filter material by the backwash operation.

Nevertheless, the high pressure spray does not completely clean the filter material of all filtered solids, biogrowth, oily buildup, and other foreign matter. In time, so much of these contaminants accumulate on the filter material that the filter apparatus has to be taken out of service for intensive washing of the filter material.

SUMMARY OF THE INVENTION

The present invention is directed to improvements in a filter apparatus and a method of cleaning filter material which facilitates the removal of filtered solids, biogrowth, and other foreign particles from the filter material. A filter apparatus of the present invention includes a tank having an influent inlet and an effluent outlet, one or more filter frames disposed between the influent inlet and the effluent outlet, and filter material supported by the filter frames.

The filter apparatus also includes a suction generating device, such as a pump and associated suction piping, for backwashing the filter material and removing solids which accumulate on the filter material during the filter operation. The suction device is typically positioned in contact with the surface of the filter material.

The filter apparatus further includes means for directing a liquid stream at high velocity against the filter material to wash the filter material and to dislodge filtered solids therefrom. Operation of the liquid directing means, or the filter washing operation, occurs in conjunction with operation of the suction generating device and while the filter material is inside the tank. The filter washing operation becomes necessary when some filtered solids become so entrained within the filter material that the suction generating device is unable to remove them.

In one embodiment of the invention, the liquid directing means has been adapted to draw from a container holding a chemical cleaning solution and to utilize the chemical cleaning solution as the wash medium. The liquid directing means includes a set of spray nozzles positioned near the filter surface and a high-pressure pump which draws from the holding container. By selecting a suitable chemical cleaning solution, the filter material may be more effectively cleaned of smaller foreign materials, including biogrowth and oily buildup, which accumulates and becomes enmeshed in the filter material, but without damaging the filter material. Moreover, by selecting a suitable cleaning solution, the filter material may be treated so as to reduce the onset of biogrowth, oily buildup and accumulation of other foreign matter on the filter material. As a result, the filter material is kept clean for longer durations, the quality of the effluent is maintained, and the filter operation is not interrupted as frequently. Furthermore, by keeping the filter material cleaner and subjecting it to less frequent cleaning operations, premature degradation of the filter material is prevented.

In another embodiment of the present invention, the holding container includes a device for dispensing cleaning chemicals and a means for passing a volume of solvent to the holding container such that the cleaning chemicals dissolve in the solvent to produce the desired chemical cleaning solution. In a further embodiment of the present invention, the solvent passing means includes a conduit disposed between the filter tank and the holding container. The solvent passing means is operable to transfer filtered effluent from the filter tank to the holding container. By using effluent as solvent rather than plant water from a utility line or from some other external source, the operation and installation costs for the filter apparatus is reduced, especially if a plant water source is not readily available. Moreover, by using effluent instead of injecting additional volumes of liquid into the filter tank during cleaning, another wastewater source is avoided.

In yet another embodiment of the present invention, the holding container includes a device for sensing the liquid volume in the holding container. The volume sensing device is placed in communication with the solvent passing means to change the operational status of the solvent passing means in response to changes in the liquid volume in the holding container. When the liquid volume reaches a minimum level, a control means, such as a microprocessor, operates a pump or valving means on the conduit to pass filtered effluent into the holding container. The dispensing device may also be prompted to dispense predetermined amounts of cleaning chemicals simultaneously with the passing of solvent into the holding container. When the liquid volume in the holding container reaches a second level, the control means stops the flow of filtered liquid through the solvent passing means.

Of course, the above-described operations may be accomplished in alternative sequences or steps. For example, the entire operation may be performed manually without the aid of control means. Moreover, the passing of solvent into the holding container may be initiated as desired, as time permits, or in some other time-dependent manner independent of the minimum level of the tank.

In a further embodiment of the invention, the liquid directing means and the suction generating device are positioned relative to the filter material such that the runoff created by the operation of the liquid directing means is substantially removed from the filter material by the suction generating device. The liquid directing means may be positioned above the liquid level facing the influent surface of the filter material or inside the filter material facing the effluent surface of the filter material. Accordingly, the suction generating device is positioned adjacent an influent surface of the filter material and below the liquid directing means. During a filter washing operation, the dislodged filtered solids and spent liquid comprising the runoff travel down the filter material toward a portion of the filter material where it is intercepted by the suction generating device. The suction generating device removes the runoff from the filter material before it can sink to the tank bottom or dissipate into the liquid influent. In the chemical washing operation, the suction generating device removes a substantial amount of the spent chemicals from the filter material before the chemicals mix with solid accumulation on the tank bottom or mix with liquid influent. This is especially important if the chemicals can negatively impact the quality of the effluent or the nature of the solid wastes removed from the tank bottom.

In a further embodiment of the invention, the cleaning method includes the step of rotating the filter frames relative to the suction generating device and the liquid directing means such that a substantial portion of the filter material is subjected to the cleaning operation. In yet another embodiment, a pressure sensing device is placed in the backwash stream to measure the flow energy losses across the filter material and, indirectly, to measure the extent of solids accumulation on the filter material. This ensures that the chemical washing operation may only be initiated when the solids accumulation has reached an undesirable level and the effectiveness of the suction generating device has been reduced. In this way, the filter material is saved from unnecessary high pressure washes, introduction of chemicals into the liquid influent is minimized, and interruptions to the filter operation are kept to a minimum.

It is a feature and an advantage of the present invention to provide a method and an apparatus for cleaning filter material in a filter apparatus which more effectively cleans the filter material of filtered solids, biogrowth, and other foreign matter.

It is another feature and advantage of the present invention to provide a method for cleaning filter material wherein substantially all of the runoff resulting from a washing step is removed directly from the filter material and discharged.

It is yet another feature and advantage of the present invention to provide a method and an apparatus for cleaning filter material in a filter apparatus which are easy to employ and will minimize filter downtime.

It is yet another feature and advantage of the present invention to provide a more effective method for cleaning filter material that does not substantially add to the wastewater burden of the filter apparatus.

BRIEF DESCRIPTION OF THE DRAWINGS

FIG. 1 is a diagrammatic vertical sectional view through the filter apparatus with the control system illustrated schematically.

FIG. 2 is a diagrammatic vertical sectional view through the filter apparatus illustrating the apparatus in a filter mode.

FIG. 3 is a diagrammatic vertical sectional view through the filter apparatus illustrating the filter apparatus in a wash mode.

DETAILED DESCRIPTION OF THE PREFERRED EMBODIMENT

The present invention is directed to a method and apparatus for cleaning filter material in a filter apparatus of the type disclosed in U.S. Pat. Nos. 5,362,401 and 5,374,360. FIGS. 1 through 3 depict a filter apparatus 11 embodying the present invention. The filter apparatus includes a filter tank 13 having an influent inlet 15 and an effluent outlet 17, a pair of filter frames 19 disposed between the influent inlet 15 and the effluent outlet 17, and filter material 21 supported by each filter frame 19. In alternative embodiments, the filter apparatus 11 can include additional filter frames or a single filter frame.

The filter frames 19 are generally vertically disposed and spaced apart in parallel relation. The filter frames 19, covered by filter material 21, are supported by and fixed to a horizontally disposed hollow drum 25, and the hollow drum is supported for rotation about its central longitudinal axis by a mounting assembly 23. The mounting assembly 23 supporting the hollow drum 25 is comprised of at least three rollers 27 which engage an outer surface 29 of the hollow drum 25 and allow the hollow drum and the filter frame 19 to be rotated about the horizontal central longitudinal axis of the drum. A sprocket 31 encircles the hollow drum 25, and a chain drive 33 drivingly engages the sprocket 31. The chain drive 33 is adapted to be driven by a motor 37 for rotating the hollow drum 25 and filter frames 19.

The filter tank 13 will typically have an open top 41, a bottom 43, and side walls 45. Along with the influent outlet 15 and the effluent outlet 17, the tank has a bottom drain outlet 47 for removing solids accumulation on the tank bottom 43 and a wash drain outlet 49 for lowering the liquid level in the filter tank 13. The filter tank 13 also includes an influent chamber 53 that is defined by the liquid retaining space inside the filter tank 13 that is outside of the filter frames 19. The filter tank 13 further includes a pair of effluent chambers 57 defined by the spaces within the filter frames 19 and enclosed by the filter material 21. As depicted in FIGS. 1 through 3, each filter frame 19 has a pair of parallel spaced part outer surfaces or influent surfaces 59 which face the influent chamber 53. Inside of the filter frames 19, the filter material 21 has a pair of parallel spaced apart inner surfaces or effluent surfaces 61 which face the effluent chamber 57. During filter operation, liquid influent containing suspended solids is supplied by gravity feed or from a pump (not shown) to an influent supply line 63 controlled by a valve 64. Through the influent supply line 63, liquid influent enters the influent chamber 53 and is passed through the filter material 21 of the filter frames 19. As the liquid passes through the filter material 21, the suspended solids are filtered out by the filter material 21 and deposited on the influent surfaces 59 and also within the filter material 21. The filtered liquid flows through the filter material 21 into the effluent chamber 57 which is fluidly connected by seals to hollow drum 25, the rising conduit 67, and the effluent outlet 17. The effluent outlet 17 is typically positioned at portions of tent the uppermost portions of the filter frames 19. During normal filtering operation, the filter frames 19 are stationary and are not rotated.

The embodiment depicted in FIGS. 1 through 3 includes both a suction generating device 69 and a liquid directing means 71. The filter material 21 on each of the filter frames 19 is advantageously backwashed by a suction generating device 69 that includes a backwash pump 72 driven by a motor 73, suction piping 75 and a plurality of suction heads 77. During the backwash operation, the suction heads 77 engage the influent surfaces 59 of the filter material 21. Preferably, the filter frame is rotated by energizing motor 37 and driving sprocket 31 through drive chain 33. In this manner, essentially all of the influent surfaces 59 of the filter material 21 is brought into contact with the suction heads 77. Typically, the filter material 21 is a flexible material such as cloth which flexibly conforms to the suction head 77 when the backwash pump 72 is actuated. During a backwash operation, the suction heads 77 draw filtered water from the effluent chambers 57 through the filter material 21 in a direction reverse of the normal filtering direction. The resulting backwash stream removes the filtered solids from the filter material 21 and carries the dislodged solids with backwash water to a discharge conduit 79 for discharge at a location (not shown) external of the filter tank 13.

There are some solids that become deeply entrained within the filter material 21 and cannot be removed by backwashing alone. In time, these solids accumulate so heavily on and within the filter material 21 that the effectiveness of the backwashing operation, as well as that of the filtering operation, is reduced. A feature of the filter apparatus 11 is a pressure sensing device 81 positioned on the suction piping 75 to the backwash pump 72 that is used to measure the extent of solids accumulation on the filter material 21 by sensing the suction pressure of the backwash pump 72 during backwashing. By sensing the suction pressure in the suction or backwash stream, the sensing device 81 indirectly measures the flow energy losses across the filter material 21 caused by solids accumulation. Accordingly, the liquid directing means 71 may be initiated only when the extent of solids accumulation on the filter material 21 reaches an undesirable level. Alternatively, pressure taps may be positioned on each side of the filter material 21 or at some other point on the suction piping 75.

The liquid directing means 71 depicted in FIGS. 1 through 3 includes a high-pressure pump 83 that is connected to four sets of spray nozzles or nozzle heads 85. Each nozzle head 85 is positioned nearly adjacent a surface 59 of the filter material 21. When actuated, the high-pressure pump 83 delivers a liquid stream at high pressure to each of the nozzle heads 85 and each nozzle head 85 directs a high velocity liquid stream against a portion of the surface 59 of the filter material 21. The liquid stream acts to wash the surface 59 and to remove solids that have accumulated thereon. The liquid stream also penetrates the surface 59 to impact and dislodge filtered solids entrained within the filter material 21. In an alternative arrangement, the nozzle heads 85 can be positioned inside the effluent chambers 57 to direct liquid streams in opposite directions against portions of the effluent surfaces 61. Operation of the liquid directing means 71 may be referred to as the filter washing operation or wash.

Prior to the filter washing operation, the liquid level in the influent chamber 53 may be lowered to a height below the nozzle heads 85 but above the suction heads 77. By exposing the nozzle heads 85, the liquid operating means 71 may be operated more efficiently. The liquid level in the influent chamber 53 may be lowered by using the wash drain outlet 49. It should be noted that the liquid directing means 71 may also be operated while nozzle heads 85 are below the liquid level.

The runoff which results from the filter washing operation is comprised primarily of spent liquid and dislodged solids. Most of the runoff travels down the filter material 21 toward the liquid level. In the filter apparatus 11 of the present invention, the suction generating device 69 and the liquid directing means 71 are positioned relative to the filter material 21 such that substantially all of the runoff is captured by the suction generating device 69 after the runoff reaches the liquid level. In removing the runoff from the filter material 21, the suction generating device 69 of the present invention prevents the runoff from dissipating into the influent chamber 53 or settling to the tank bottom 43. The nozzle heads 85 in the drawings are positioned above the liquid level and near the influent surfaces 59 of the filter material 21. Each of the suction heads 77 is positioned below the liquid level and directly below one of the nozzle heads 85. Alternatively, the nozzle heads 85 may be positioned inside of the filter frame 19 to direct a high velocity liquid stream to an effluent surface 61 of the filter material 21. Even when the nozzle heads 85 are positioned inside the filter frames 19, the suction heads 85 may remain positioned outside of the filter frame 19 where they are engageable with a portion of the influent surface 59 that intersects the downward travel of runoff.

The liquid directing means 71 includes a conduit 87 between the suction side of the high-pressure pump 83 and a secondary tank or holding container 91. In this arrangement, the pump 83 is operable to draw liquid from the holding container 91 and to direct a liquid stream at high pressure to the nozzle heads 85. In a further embodiment, the holding container 91 is connected to the drum header 25 of the filter tank 13 such that filtered effluent may be transferred into the holding container 91 to be utilized as the liquid medium for the liquid directing means 71 rather than an external water source. This arrangement avoids introducing more liquid into the filter tank 13 and creating an additional wastewater source.

In the embodiment depicted in FIGS. 1 through 3, the liquid directing means 71 has been adapted to utilize a commercially available chemical cleaning solution as the liquid medium rather than plant water or plain filtered effluent. The selection of a type of chemical cleaning solution will be determined by the particular filtering application and the characteristics of the filter material employed. In some applications, a chemical cleaning solution may be selected for its suitability for chemically cleaning the filter material of smaller solid particles, biogrowth, and other foreign matter which accumulates and becomes enmeshed in the filter material. In other applications, a chemical cleaning solution will be selected for its ability to retard the onset of biogrowth and oily buildup, and other hard to clean conditions. A chemical cleaning solution may also be selected for its ability to scrub the filter material free of solid particles and other contaminants without damaging the filter material and to unclog filter passages in the filter material.

The holding container 91 depicted in FIG. 1 is designed for holding a chemical cleaning solution and for cooperating with the liquid directing means 71 described above. The holding container 91 may be an open-top tank or an enclosed cylinder. The holding container may be made of metal or polymer, or equipped with a liner. The design details will depend primarily on the properties of the chemical cleaning solution selected.

The holding container 91 also includes a device 93 for transferring pre-determined quantities of cleaning chemicals into the holding container 91 to mix with pre-determined amounts of solvent. Use of the dispensing device 93 ensures that the quality and consistency of the chemical cleaning solution is maintained through successive filter cleaning operations. Although in some applications, a manual dispensing device will be adequate, there are some applications, i.e., high volume applications and remote applications, where it will be advantageous to automate the chemical dispensing function and to integrate it into the overall control scheme of the filter apparatus 11. Manual or automated dispensing devices for chemicals in both the solid or liquid form are commercially available. It will be apparent to one skilled in the art to adapt and integrate any of these devices into the filter apparatus 11 of the present invention. Operation of the liquid directing means 71 wherein a chemical cleaning solution is utilized as the liquid medium may be referred to as the chemical washing operation or chemical wash.

The holding container 91 depicted in FIG. 1 further includes an inbound conduit 95 disposed between the wash drain outlet 49 of the filter tank 13 and an inbound nozzle 97 in the holding container 91. The inbound conduit 95 provides a means 99 for passing liquid effluent into the holding container 91 to act as a solvent. A pump 101 positioned in the inbound conduit 95 can be operated to pump effluent from the filter tank 13 to the holding container 91. When gravity is sufficient to pass the liquid effluent from the filter tank 13 to the holding container 91, only a control valve is required in the inbound conduit 95. In alternative embodiments, an inbound conduit may be fluidly connected to the effluent outlet 17 or directly to the drum header 25. In further embodiments, an inbound conduit may be fluidly connected to an external solvent supply such as a water container or a plant utility water source.

The holding container 91 further includes a volume sensing device 103 for monitoring the volume of chemical cleaning solution in the holding container 91. A low volume indicator 105 is used to prompt the solvent passing means 99 to pass liquid effluent into the holding container 91 for mixing with chemicals dispensed from the chemical dispensing device 93. A high volume indicator 107 is used to indicate that there is a sufficient supply of chemical cleaning solution available in the holding container 91 and to stop the flow of liquid effluent into the holding container 91. The volume sensing device 103 may also be integrated into the control scheme of the filter operation. FIG. 1 depicts a level sensing device with a low level indicator 105 and a high level indicator 107. The level sensing device 103 is logically connected to a control means or microprocessor 109 that controls the other automated functions of the filter apparatus 11. In other arrangements, the level sensing device 103 described above can be replaced with alternative level or volume sensing means. Moreover, the solvent passing operation may be operated manually or according to some other logic or sequence.

Operation of the filter apparatus 11 is preferably controlled by a microprocessor 109, or other control means having input means 119 and output means 121, and of the type which can be programmed to initiate and time certain functions, including the filtering operation itself. FIG. 1 illustrates some of the functions that can be controlled by the microprocessor 109. These automated functions include the backwash operation, operation of the liquid directing means 71, passing of liquid effluent from the filter tank 13 to the holding container 91, dispensing of cleaning chemicals into the holding container 91, and draining and filling of the filter tank 13 with liquid effluent. The microprocessor 109 may also receive and respond to signals from the liquid level sensing device 103 in the holding container 91, a liquid level sensing device (not shown) in the filter tank 13, and the pressure sensing device 81 on the suction piping 75 to the backwash pump 72. In the embodiment depicted in FIG. 1, the microprocessor 109 can send a signal to, and initiate operation of, an inlet control valve 64, a motor 73 for the backwash pump 72, a motor 115 for the high-pressure pump 83 of the liquid directing means 71, a motor (not shown) for the pump 101 of the solvent passing means 99, and the motor 37 for driving the sprockets 31 of the filter frames 19.

FIG. 2 depicts the filter apparatus 11 during a normal filter operation. The liquid level in the filter tank 13 is above the filter frames 19 and the filter material 21 is completely immersed in the liquid. In this mode, the backwash pump 72 may be operated to backwash the filter material 21. Moreover, the filter frames 19 may be rotated in conjunction with the operation of the backwash pump 72 so that substantially all of the surfaces 59 of the filter material 21 are subjected to backwashing.

FIG. 3 depicts the filter apparatus 11 in the chemical wash mode. Prior to operation of the liquid directing means 71, the liquid level in the tank may be lowered below the nozzle heads 85 by draining influent through the wash drain outlet 49. FIGS. 2 and 3 also illustrate the optimal positioning of the suction generating device 69 relative to the liquid directing means 71. The nozzle heads 85 are operated to direct a high-velocity stream of chemical cleaning solution to the surfaces 59 of the filter material 21. Moreover, the filter frame 19 may be rotated about both the nozzle heads 85 and the suction heads 77 such that a substantial portion, if not all, of the filter material 21 is subjected to a chemical wash.

While one embodiment of the present invention has been shown and described, alternate embodiments will be apparent to those skilled in the art and are within the intended scope of the present invention. Therefore, the scope of the present invention is to be limited only by the following claims.

What is claimed is:

1. A method for cleaning filter material retained in a filter frame of a filter apparatus, the filter apparatus including a tank having an inlet and an outlet, the filter material being supported by the filter frame inside the tank between the inlet and the outlet and for filtering out suspended solids from liquid passed through the filter material as the liquid flows from the inlet to the outlet, the cleaning method comprising the steps of:

placing a volume of a chemical cleaning solution in a holding container;

chemically washing a first portion of the filter material by directing a stream of the chemical cleaning solution to the first portion of the filter material, when the filter frame is inside the tank; and positioning at least one suction generating device adjacent a second portion of the filter material to remove, from the filter material, substantially all run off of the chemical solution directed to the first portion, wherein the second portion is adjacent the first portion.

2. The cleaning method of claim 1, further comprising the step of:

moving the filter material past the stream of chemical cleaning solution during the step of chemically washing a first portion of the filter material, such that more than one portion of the filter material is chemically washed.

3. The cleaning method of claim 1, further comprising the step of:

intermittently operating the suction generating device to draw liquid in a reverse direction through a section of the filter material such that filtered solids are removed from the filter material.

4. The cleaning method of claim 3, further comprising the step of:

moving the filter material relative to the suction generating device during the operation of the suction generating device, such that liquid is drawn in a reverse direction through more than one section of the filter material.

5. The cleaning method of claim 1, further comprising the step of:

lowering a liquid level of the filter tank before the step of chemically washing a first portion of the filter material such that the stream of chemical cleaning solution is directed to a first portion of the filter material that is above the liquid level; and wherein the step of positioning the suction generating device includes positioning the suction generating device adjacent a second portion that is below the liquid level.

6. The cleaning method of claim 1, wherein the operation of the suction generating device generates a suction flow stream, and further comprising the steps of:

sensing a pressure in the suction flow stream; and initiating the step of chemically washing a portion of the filter material when the sensed pressure in the suction flow stream reaches a pre-determined pressure.

7. The cleaning method of claim 1, wherein the step of placing a volume of a chemical cleaning solution in a holding container includes the steps of:

transferring a quantity of chemicals suitable for cleaning into the holding container;

transferring a volume of solvent into the holding container, wherein the cleaning chemicals are soluble in the solvent; and mixing the contents of the holding container to produce the chemical cleaning solution.

8. The cleaning method of claim 7, wherein the step of transferring a volume of solvent into the holding container includes the step of:

passing filtered liquid from the tank into the holding container, wherein the filtered liquid acts as the solvent.

9. The cleaning method of claim 7, further comprising the steps of:

sensing the liquid volume in the holding container; and initiating the step of placing a volume of a chemical cleaning solution in the holding container when the liquid volume in the holding container is at a pre-determined volume.

10. A filter apparatus for filtering suspended solids from liquid influent, the filter apparatus comprising:

a tank including an influent chamber having an inlet and the tank having an outlet for effluent;

a filter frame positioned inside the tank between the influent chamber and the outlet;

filter material supported by the filter frame, the filter material having an influent surface and an effluent surface, wherein the influent surface faces the influent chamber, such that liquid influent can be passed through the filter material from the influent chamber to the outlet;

means for chemically washing a first portion of the filter material, the chemical washing means including a holding container for holding a chemical cleaning solution and means for directing a stream of the chemical cleaning solution to the first portion of the filter material; and a suction generating device positioned adjacent a second portion of the filter material for removing, from the filter material, substantially all runoff of the chemical cleaning solution directed to the first portion, the second portion being adjacent the first portion.

11. The filter apparatus of claim 10, wherein the suction generating device is positioned to draw filtered liquid through the filter material in a reverse direction.

12. The filter apparatus of claim 10 wherein the filter frame is movable relative to the chemical washing means.

13. The filter apparatus of claim 10, wherein the holding container includes:

a device for dispensing chemicals suitable for cleaning; and means for operably passing a volume of a solvent to the container, wherein the cleaning chemicals are soluble in the solvent to produce the chemical cleaning solution.

14. The filter apparatus of claim 13, wherein the solvent passing means includes a conduit for passing filtered liquid from the tank into the holding container, the conduit being disposed between the tank and the holding container.

15. The filter apparatus of claim 13, wherein the holding container includes:

a sensory device for sensing the liquid volume in the holding container, the sensory device being in communication with the solvent passing means such that the sensory device changes the operational status of the solvent passing means in response to changes in the chemical cleaning solution volume in the holding container.

16. The filter apparatus of claim 10, wherein the tank has a liquid level, the chemical washing means being positioned above the liquid level.

17. The filter apparatus of claim 10, wherein the chemical washing means includes at least one spray nozzle.

18. The filter apparatus of claim 10, wherein the second portion is on the influent surface.

19. A filter apparatus for filtering suspended solids from liquid influent, the apparatus comprising:

a tank including an influent chamber having an inlet and an outlet for effluent;

a filter frame positioned inside the tank between the influent chamber and the outlet;

filter material supported by the filter frame, the filter material having an influent surface and an effluent surface, wherein the influent surface faces the influent chamber, such that liquid influent can be passed through the filter material from the influent chamber to the outlet;

a suction generating device positioned adjacent a first portion of the filter material, the first portion being on the influent surface; and means for directing a liquid stream of a chemical cleaning solution to a second portion of the filter material to separate filtered solids from the filter material, wherein the second portion is adjacent the first portion such that separated filtered solids and runoff of spent chemical cleaning solution are removable from the filter material by the suction generating device, and wherein the second portion is above a liquid level of the tank.

20. The filter apparatus of claim 19, wherein the second portion of the filter material is on the influent surface directly above the first portion of the filter material.

21. The filter apparatus of claim 19, wherein the liquid directing means includes a spray nozzle.

22. The filter apparatus of claim 19, wherein the filter frame is movable relative to the liquid directing means.

23. The filter apparatus of claim 19, further comprising:
   a holding container for holding a chemical cleaning solution, the holding container being in fluid communication with the liquid directing means such that the liquid directing means directs a stream of the chemical cleaning solution from the holding container to the second portion of the filter material.

24. The filter apparatus of claim 23, further comprising: means for operably passing filtered liquid from the tank into the holding container.

25. The filter apparatus of claim 24, wherein the passing means includes a conduit fluidly interconnecting the tank with the holding container.

* * * * *